United States Patent [19]

Chen

[11] Patent Number: 5,676,800
[45] Date of Patent: Oct. 14, 1997

[54] DISTILLING APPARATUS

[75] Inventor: Chih Chen, Taipei Hsien, Taiwan

[73] Assignee: Ping-Hong Chen, San Tsung, Taiwan

[21] Appl. No.: 645,727

[22] Filed: May 14, 1996

[51] Int. Cl.⁶ .................................. B01D 3/42; C02F 1/04
[52] U.S. Cl. .................... 202/176; 159/DIG. 1; 202/181; 202/185.3; 202/185.4; 202/185.5; 203/1; 203/10; 203/22; 203/100; 203/DIG. 8
[58] Field of Search ............ 202/176, 185.3, 202/185.4, 185.5, 180, 181, 182, 235, 188–189; 203/1, 10, 22, 100, DIG. 8; 159/24.1, 44, DIG. 1; 137/386, 391; 392/311, 386

[56] References Cited

U.S. PATENT DOCUMENTS

| | | | |
|---|---|---|---|
| 861,485 | 7/1907 | Stokes | 202/188 |
| 3,401,091 | 9/1968 | Gidner | 202/176 |
| 3,458,404 | 7/1969 | Vincent et al. | 202/176 |
| 3,718,544 | 2/1973 | Sims | 202/185.3 |
| 3,825,491 | 7/1974 | Sanchez | 202/189 |
| 3,859,173 | 1/1975 | Barckhausen | 202/189 |
| 3,935,077 | 1/1976 | Dennison | 202/180 |
| 4,052,267 | 10/1977 | McFee | 203/10 |
| 4,089,750 | 5/1978 | Kirshman et al. | 202/180 |
| 4,252,616 | 2/1981 | Glazer | 202/176 |
| 4,917,770 | 4/1990 | Asbury et al. | 203/10 |
| 4,943,353 | 7/1990 | Shannon | 202/181 |
| 4,957,280 | 9/1990 | Turner et al. | 203/10 |
| 5,217,580 | 6/1993 | Chen | 202/185.2 |
| 5,348,623 | 9/1994 | Salmon | 203/10 |
| 5,368,698 | 11/1994 | Field et al. | 203/10 |
| 5,565,065 | 10/1996 | Wang | 202/176 |

*Primary Examiner*—Virginia Manoharan
*Attorney, Agent, or Firm*—Bo-In Lin

[57] ABSTRACT

A distilling apparatus which includes a water chamber to receive cold water from an external water supply source, a heating chamber having an electric heater controlled to heat water to the boiling point, a guide pipe connected between the bottom side of the water chamber and the bottom end of the heat chamber to guide water from the water chamber to the heating chamber, a radiating coil pipe connected to a distilled water drain pipe outside the apparatus, and a steam pipe connected between the steam chamber and the radiating coil pipe and passing through the water chamber to guide steam from the heating chamber to the radiating coil pipe, permitting steam to be condensed into distilled water and heat to be absorbed by water in the water chamber.

3 Claims, 1 Drawing Sheet

DISTILLING APPARATUS

BACKGROUND OF THE INVENTION

The present invention relates to distilling apparatus, and relates more particularly to such a distilling apparatus which produces a heat exchanging process to pre-heat water before steam is condensed into distilled water.

Various distilling apparatus have been disclosed for making distilled water for drinking, and have appeared on the market. These distilling apparatus commonly use an electric heater to heat water to the boiling point, and a condenser means to condense steam into distilled water. Because these distilling apparatus direct heats cold water to the boiling point, much electric is wasted, and it takes a long time to heat cold water to the boiling point. Furthermore, when steam is being condensed into distilled water, the heating efficiency is greatly reduced.

SUMMARY OF THE INVENTION

The present invention provides a distilling apparatus which eliminates the aforesaid drawbacks. It is one object of the present invention to provide a distilling apparatus which uses the heat of steam to warm up water so that water can be quickly heated to the boiling point. It is another object of the present invention to provide a distilling apparatus which allows the process of heating to heat water to the boiling point and the process of condensing to condense steam into distilled water to be simultaneously proceeded within the water chamber so that distilled water can be efficiently obtained.

DETAILED DESCRIPTION OF THE PREFERRED EMBODIMENT

Figure 1:
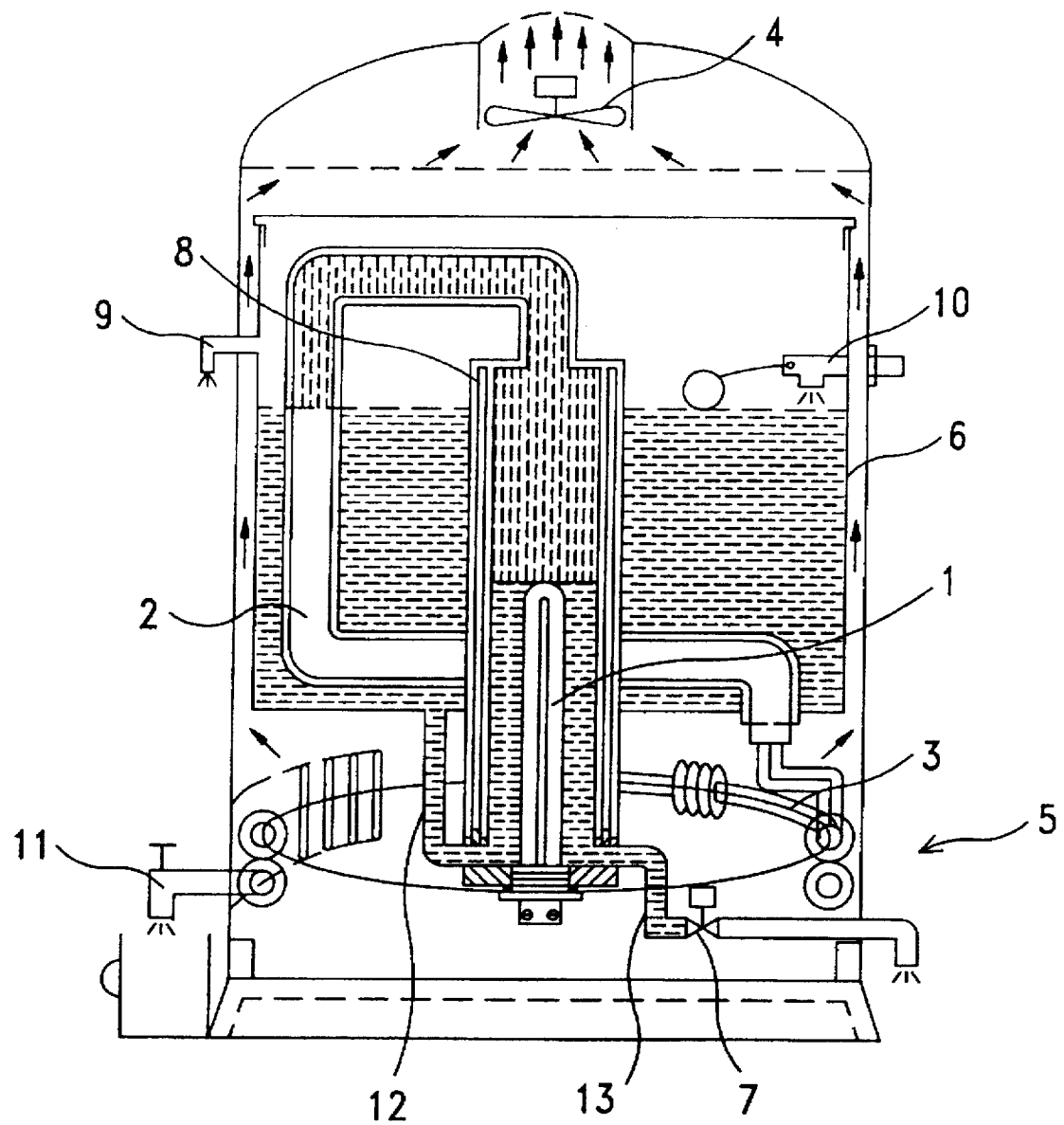
FIG. 1 is the only figure of the present invention, showing the internal structure of the distilling apparatus.

Referring to FIG. 1, the housing, referenced by 5, has a cylindrical shape. A water chamber 6 is made inside the housing 5 at a suitable elevation. A heating chamber 8 is suspended in the housing 5 and inserted through the center of the water chamber 6, having a top end disposed above the water chamber 6 and a bottom end disposed below the water chamber 6. A guide tube 12 is installed inside the housing 5 to guide water from the water chamber 6 to the heating chamber 8, having a top end connected to the bottom side of the water chamber 6 and a bottom end connected to the bottom end of the heating chamber 8. The heating chamber 8 has a sludge drain pipe 13 at the bottom for carrying off waste. A solenoid valve 7 is installed in the sludge drain pipe 13 to control its opening. A steam pipe 2 is provided having a top end connected to the top end of the heating chamber 8 and a bottom end extending along the bottom side of the water chamber 6 and then connected to a radiating coil pipe 3. The radiating coil pipe 3 is mounted around the bottom end of the heating chamber 8, having one end connected to the steam pipe 2 and an opposite end connected to a distilled water drain pipe 11 outside of the housing 5 for output of distilled water. A water supply tube with a float valve 10 is connected to the water chamber 6 at one side at a suitable elevation for controlling the supply of water to the water chamber 6. An overflow pipe 9 is connected to the water chamber 6 at an opposite side at a higher elevation than the water supply tube with a float valve 10 for guiding excessive amount of water from the water chamber 6 out of the housing 5. A cooling fan 4 is installed in the top of the housing 5 and controlled to produce outward currents of air to carry heat from the radiating coil pipe 3 out of the housing 5.

When in use, water is guided from the water chamber 6 to the heating chamber 8 by the guide tube 12 and then heated to the boiling point by the electric heater 1, permitting steam to pass through the steam pipe 2 to the radiating coil pipe 3. When steam passes through the Steam pipe 2, water in the water chamber 6 absorbs heat from the steam pipe 2, causing steam to be condensed into distilled water. When distilled water passes through the radiating coil pipe 3 to the distilled water drain pipe 11, its temperature is reduced further. The heat exchanging process between water in the water chamber 6 and steam in the steam pipe 2 pre-heats water in the water chamber 6 so that pre-heated water can be heated to the boiling point by the electric heater 1 quickly. Furthermore, the design of the overflow pipe 9 and the water supply pipe with a float valve 10 keeps the amount of water in the water chamber 6 to be maintained at a fixed level, i.e., a corresponding amount of fresh water is guided into the water chamber 6 when a certain amount of water is heated to the boiling point and changed into steam.

While only one embodiment of the present invention has been shown and described, it will be understood that various modifications and changes could be made thereunto without departing from the spirit and scope of the invention disclosed.

What the invention claimed is:

1. A distilling apparatus comprising:

a housing having a cylindrical shape;

a water chamber defined inside said housing, having a top side and a bottom side;

a water supply pipe mounted in a hole on said housing and connected to a water supply source for guiding water to said water chamber;

a heating chamber suspending in said housing and inserted through a center of said water chamber, having a top end disposed above the top side of said water chamber and a bottom end disposed below the bottom side of said water chamber and, the bottom end of said heating chamber having a sludge drain pipe extending out of said housing, said sludge drain pipe being controlled by a solenoid valve for carrying off waste;

a guide tube having a top end connected to the bottom side of said water chamber and a bottom end connected to the bottom end of said heating chamber to guide water from said water chamber to said heating chamber;

an electric heater mounted inside said heating chamber to heat water to the boiling point;

a steam pipe having a top end connected to the top end of said heating chamber, and a bottom end extending along the bottom side of said water chamber and then connected to a radiating coil pipe;

a radiating coil pipe mounted around the bottom end of said heating chamber, having one end connected to said steam pipe and an opposite end connected to a distilled water drain pipe outside of said housing; and an overflow pipe connected to said water chamber at an elevation above said water supply pipe to guide an overflow of water from said water chamber out of said housing.

2. The distilling apparatus of claim 1 wherein a float valve is installed in one end of said water supply pipe within said water chamber to automatically close said water supply pipe when the level of water in said water chamber surpasses a predetermined value.

3. The distilling apparatus of claim 1 wherein a cooling fan is installed in said housing at a top side and controlled to produce outward currents of air to carry heat from said radiating coil pipe out of said housing.

* * * * *